United States Patent
Liu et al.

(10) Patent No.: US 11,895,215 B2
(45) Date of Patent: Feb. 6, 2024

(54) APPLICATION SERVER ACCESS METHOD AND TERMINAL

(71) Applicant: HUAWEI TECHNOLOGIES CO., LTD., Guangdong (CN)

(72) Inventors: Binjun Liu, Shanghai (CN); Yuwei Fan, Shanghai (CN); Fusheng Shen, Shanghai (CN); Weichen Zhu, Shenzhen (CN); Lixin Lin, Shanghai (CN); Ying Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/910,711

(22) PCT Filed: Mar. 4, 2021

(86) PCT No.: PCT/CN2021/079121
§ 371 (c)(1),
(2) Date: Sep. 9, 2022

(87) PCT Pub. No.: WO2021/179990
PCT Pub. Date: Sep. 16, 2021

(65) Prior Publication Data
US 2023/0171330 A1    Jun. 1, 2023

(30) Foreign Application Priority Data

Mar. 11, 2020    (CN) .......................... 202010167415.3

(51) Int. Cl.
*H04L 61/4511*    (2022.01)
*H04L 69/167*    (2022.01)
*H04L 101/659*    (2022.01)

(52) U.S. Cl.
CPC ........ *H04L 69/167* (2013.01); *H04L 61/4511* (2022.05); *H04L 2101/659* (2022.05)

(58) Field of Classification Search
CPC .............. H04L 69/167; H04L 61/4511; H04L 2101/65; H04L 2101/661; H04L 45/741; H04L 69/169
(Continued)

(56) References Cited

U.S. PATENT DOCUMENTS 10,193,879 B1 *  1/2019  Rodgers .............. G06F 9/45558
11,134,058 B1 *  9/2021  Sole ....................... H04W 12/12
(Continued)

FOREIGN PATENT DOCUMENTS

CN    101917491 A    12/2010
CN    102137172 A    7/2011
(Continued)

OTHER PUBLICATIONS

Han et al., "NAT64/DNS64-Based IPv6 Transition Mechanism," e-Science Technology & Application, Sep. 20, 2016, 8 pages (with English abstract).
(Continued)

*Primary Examiner* — Khanh Q Dinh
(74) *Attorney, Agent, or Firm* — Fish & Richardson P.C.

(57) ABSTRACT

The present disclosure relates to application server access methods and terminals. One example method includes in response to a terminal failing to connect to an application server by using an IPv6 address, setting an accessed domain name to a restricted domain name, and, when the accessed domain name is re-accessed later, connecting to the application server by directly using an IPv4 address.

17 Claims, 10 Drawing Sheets

(58) Field of Classification Search
USPC .................... 709/220, 224, 225, 226, 228
See application file for complete search history.

(56) References Cited

U.S. PATENT DOCUMENTS

| | | | | |
|---|---|---|---|---|
| 11,159,546 | B1* | 10/2021 | Moore | H04L 63/0245 |
| 11,196,748 | B1* | 12/2021 | Croney | H04L 63/102 |
| 11,303,606 | B1* | 4/2022 | Chew | H04L 45/7453 |
| 11,509,498 | B1* | 11/2022 | Overcash | H04L 41/16 |
| 11,726,934 | B2* | 8/2023 | Crowder | G06F 9/5038 |
| | | | | 710/5 |
| 11,743,325 | B1* | 8/2023 | Dunsmore | G06F 9/455 |
| | | | | 709/203 |
| 11,750,514 | B1* | 9/2023 | Rajkovic | H04L 45/74 |
| | | | | 370/389 |
| 2011/0242975 | A1 | 10/2011 | Zhao et al. | |
| 2016/0308818 | A1* | 10/2016 | Torres | H04B 7/2126 |
| 2018/0167359 | A1 | 6/2018 | Kish et al. | |

FOREIGN PATENT DOCUMENTS

| | | |
|---|---|---|
| CN | 102368789 A | 3/2012 |
| CN | 103888552 A | 6/2014 |
| CN | 104519148 A | 4/2015 |
| CN | 104702707 A | 6/2015 |
| CN | 104780231 A | 7/2015 |
| CN | 106161667 A | 11/2016 |
| CN | 108270882 A | 7/2018 |

OTHER PUBLICATIONS

International Search Report and Written Opinion in International Appln. No. PCT/CN2021/079121, dated May 26, 2021, 17 pages (with English translation).

* cited by examiner

APPLICATION SERVER ACCESS METHOD AND TERMINAL

CROSS-REFERENCE TO RELATED APPLICATIONS

This application is a national stage of International Application No. PCT/CN2021/079121, filed on Mar. 4, 2021, which claims priority to Chinese Patent Application No. 202010167415.3, filed on Mar. 11, 2020. Both of the aforementioned applications are hereby incorporated by reference in their entireties.

TECHNICAL FIELD

This application relates to the field of communications technologies, and in particular, to an application server access method and a terminal.

BACKGROUND

Because an internet protocol version 4 (Internet Protocol version 4, IPv4) address is exhausted, a service provider needs to change from deploying an application server of IPv4 to deploying an application server of IPv6. Therefore, the service provider starts to deploy the application server of IPv6 or deploy a dual-stack (Dual Stack) application server. The dual-stack application server supports both an IPv4 protocol stack and an IPv6 protocol stack. In other words, during transition from the application server of IPv4 to the application server of IPv6, both the application server of IPv4 and the application server of IPv6 exist on a network. In this case, a terminal may access the application server by using an IPv4 address, or may access the application server by using an IPv6 address.

Currently, most terminals support a dual-stack function of IPv4 and IPv6 by default. Considering that IPv6 deployment is a development trend of a future network, the terminal usually accesses the application server by preferentially using the IPv6 address. However, some application servers do not well support IPv6 at present. When the terminal accesses the application server by using the IPv6 address, the terminal often fails to receive a response. As a result, user's internet access experience is poor.

SUMMARY

This application provides an application server access method and a terminal, so that when an application server does not well support IPv6, a case in which a terminal repeatedly connects to the application server by preferentially using an IPv6 address and repeatedly fails is avoided. This improves a success rate of connection between the terminal and the application server and efficiency of successful connection, and helps improve user's internet access experience.

To achieve the foregoing objectives, embodiments of this application provide the following technical solutions.

According to a first aspect, a communications system is provided, including a terminal, a domain name system server, and an application server. The terminal is configured to: receive a first operation of a user, where the first operation indicates to access a first domain name; and send a first domain name resolution request to the domain name system server, where the first domain name resolution request is used to request an IPv4 address and an IPv6 address corresponding to the first domain name. The domain name system server is configured to return, according to the first domain name resolution request, the IPv4 address and the IPv6 address corresponding to the first domain name to the terminal. The terminal is further configured to: send a first connection request to the application server, where the first connection request includes the IPv6 address corresponding to the first domain name; when determining that connection to the application server by using the IPv6 address fails, set the first domain name corresponding to the IPv6 address to restricted information; receive a second operation of the user, where the second operation indicates to re-access the first domain name; and send a second connection request to the application server, where the second connection request includes the IPv4 address corresponding to the first domain name.

It can be learned that, in this application, the terminal identifies a problem scenario in which the terminal fails to perform the connection by using the IPv6 address, and sets an accessed domain name (that is, the first domain name) in the problem scenario as a restricted domain name. In this way, when the first domain name is re-accessed later, the IPv4 address is directly used to connect to the application server. Therefore, when the application server does not well support IPv6, a case in which the terminal repeatedly connects to the application server by preferentially using the IPv6 address and repeatedly fails may be avoided. This improves a success rate of connection between the terminal and the application server and efficiency of successful connection, and helps improve user's internet access experience.

In a possible implementation, the terminal is further configured to: before sending the second connection request to the application server, where the second connection request includes the IPv4 address corresponding to the first domain name, send a second domain name resolution request to the domain name system server, to request the IPv4 address corresponding to the first domain name.

That is, after determining that the first domain name is the restricted domain name, when re-accessing the first domain name, the terminal requests only the IPv4 address corresponding to the first domain name from the domain name system server, and then accesses the application server by directly using the IPv4 address.

In a possible implementation, the terminal is further configured to: before sending the second connection request to the application server, where the second connection request includes the IPv4 address corresponding to the first domain name, send a third domain name resolution request to the domain name system server, to request the IPv4 address and the IPv6 address corresponding to the first domain name.

That is, when re-accessing the first domain name, the terminal still requests the IPv4 address and the IPv6 address corresponding to the first domain name from the domain name system server, but accesses the application server by only using the IPv4 address.

In a possible implementation, the terminal is further configured to: if determining that air-interface communication of the terminal is normal and determining that a retransmission timer includes an IPv6-type socket, a status of the IPv6-type socket is a preset state, and a quantity of retransmission times of the first connection request is greater than a preset quantity of times, determine that the connection to the application server by using the IPv6 address fails. Therefore, a specific method for identifying a problem scenario is provided.

In a possible implementation, the terminal is further configured to: after a preset time period, set the first domain name to non-restricted information.

In a possible implementation, the terminal is further configured to: receive a third operation of the user, where the third operation indicates to access the first domain name; and send a third connection request to the application server, where the third connection request includes the IPv6 address corresponding to the first domain name.

For example, when maintaining a restricted list, the terminal may alternatively set a life cycle of the restricted list or a life cycle of each information item (that is, a restricted domain name or a restricted network address) in the restricted list. That is, within the life cycle, the restricted list or a corresponding information item in the restricted list is valid. After the life cycle expires, the restricted list or the corresponding information item in the restricted list is invalid.

For example, if the life cycle of the restricted list is set to seven days, the restricted list is valid within the life cycle (seven days). If all information items in the restricted list are valid, the terminal may also add a new information item to the restricted list. When the life cycle expires, the terminal deletes all existing content from the restricted list. The terminal re-adds a corresponding information item of the restricted domain name or the restricted network address to the restricted list based on the identification of the problem scenario. It is equivalent to that the terminal periodically updates all the information items in the restricted list by using the life cycle as a cycle. Therefore, when the application server is updated, the application server may switch from poor support for the IPv6 to better support, so that the terminal may restore to accessing the application server by preferentially using the IPv6 addresses.

For another example, a life cycle of each information item in the restricted list is set to seven days. For example, from a time point when the first domain name is added to the restricted list, the first domain name is a restricted domain name within the life cycle. When the life cycle expires, the first domain name is no longer a restricted domain name, and the first domain name may be deleted from the restricted list. Therefore, when the application server is updated, the terminal may restore to accessing the application server by preferentially using the IPv6 address.

According to a second aspect, an application server access method is provided. The method includes: A terminal receives a first operation of a user, where the first operation indicates to access a first domain name. The terminal sends a first domain name resolution request to a domain name system server in response to receiving the first operation of the user, where the first domain name resolution request is used to request an IPv4 address and an IPv6 address corresponding to the first domain name. The terminal sends a first connection request to an application server, where the first connection request includes the IPv6 address corresponding to the first domain name. When the terminal determines that connection to the application server by using the IPv6 address fails, the terminal sets the first domain name corresponding to the IPv6 address to restricted information. The terminal receives a second operation of the user, where the second operation indicates to re-access the first domain name. The terminal sends a second connection request to the application server in response to receiving the second operation of the user, where the second connection request includes the IPv4 address corresponding to the first domain name.

It can be learned that, in this application, the terminal identifies a problem scenario in which the terminal fails to perform the connection by using the IPv6 address, and sets an accessed domain name (that is, the first domain name) in the problem scenario as a restricted domain name. In this way, when the first domain name is re-accessed later, the IPv4 address is directly used to connect to the application server. Therefore, when the application server does not well support IPv6, a case in which the terminal repeatedly connects to the application server by preferentially using the IPv6 address and repeatedly fails may be avoided. This improves a success rate of connection between the terminal and the application server and efficiency of successful connection, and helps improve user's internet access experience.

In a possible implementation, that the terminal sends a second connection request to the application server in response to receiving the second operation of the user, where the second connection request includes the IPv4 address corresponding to the first domain name includes: The terminal sends a second domain name resolution request to the domain name system server in response to receiving the second operation of the user, to request the IPv4 address corresponding to the first domain name. The terminal receives the IPv4 address returned by the domain name system server, and sends the second connection request to the application server, where the second connection request includes the IPv4 address.

That is, after determining that the first domain name is the restricted domain name, when re-accessing the first domain name, the terminal requests only the IPv4 address corresponding to the first domain name from the domain name system server, and then accesses the application server by directly using the IPv4 address.

In a possible implementation, that the terminal sends a second connection request to the application server in response to receiving the second operation of the user, where the second connection request includes the IPv4 address corresponding to the first domain name further includes: The terminal sends a third domain name resolution request to the domain name system server in response to receiving the second operation of the user, to request the IPv6 address and the IPv4 address corresponding to the first domain name. The terminal receives the IPv6 address and the IPv4 address returned by the domain name system server, and sends the second connection request to the application server, where the second connection request includes the IPv4 address.

That is, when re-accessing the first domain name, the terminal still requests the IPv4 address and the IPv6 address corresponding to the first domain name from the domain name system server, but accesses the application server by only using the IPv4 address.

In a possible implementation, that the terminal determines that connection to the application server by using the IPv6 address fails includes: If the terminal determines that air-interface communication is normal and determines that a retransmission timer includes an IPv6-type socket, a status of the IPv6-type socket is a preset state, and a quantity of retransmission times of the first connection request is greater than a preset quantity of times, the terminal determines that the connection to the application server by using the IPv6 address fails. Therefore, a specific method for identifying a problem scenario is provided.

In a possible implementation, after the terminal sets the first domain name corresponding to the IPv6 address to the restricted information, the method further includes: The terminal deletes the cached IPv6 address corresponding to the first domain name. For example, when maintaining a restricted list, the terminal may alternatively set a life cycle of the restricted list or a life cycle of each information item (that is, a restricted domain name or a restricted network address) in the restricted list. That is, within the life cycle, the restricted list or a corresponding information item in the restricted list is valid. After the life cycle expires, the restricted list or the corresponding information item in the restricted list is invalid.

In a possible implementation, the method further includes: after a preset time period, the terminal sets the first domain name to non-restricted information.

In a possible implementation, after the terminal sets the first domain name to the non-restricted information, the method further includes: receiving a third operation of the user, where the third operation indicates to access the first domain name. The terminal sends a third connection request to the application server in response to receiving the third operation of the user, where the third connection request includes the IPv6 address corresponding to the first domain name.

According to a third aspect, a terminal is provided, including a processor, a memory, and a touchscreen. The memory and the touchscreen are coupled to the processor, the memory is configured to store computer program code, the computer program code includes computer instructions, and when the processor reads the computer instructions from the memory, the terminal is enabled to perform the following operations: receiving a first operation of a user, where the first operation indicates to access a first domain name; sending a first domain name resolution request to a domain name system server in response to receiving the first operation of the user, where the first domain name resolution request is used to request an IPv4 address and an IPv6 address corresponding to the first domain name; sending a first connection request to an application server, where the first connection request includes the IPv6 address corresponding to the first domain name; when the terminal determines that connection to the application server by using the IPv6 address fails, setting the first domain name corresponding to the IPv6 address to restricted information; receiving a second operation of the user, where the second operation indicates to re-access the first domain name; and sending, by the terminal, a second connection request to the application server in response to receiving the second operation of the user, where the second connection request includes the IPv4 address corresponding to the first domain name.

In a possible implementation, the sending, by the terminal, a second connection request to the application server in response to receiving the second operation of the user, where the second connection request includes the IPv4 address corresponding to the first domain name includes: The terminal sends a second domain name resolution request to the domain name system server in response to receiving the second operation of the user, to request the IPv4 address corresponding to the first domain name. The terminal receives the IPv4 address returned by the domain name system server, and sends the second connection request to the application server, where the second connection request includes the IPv4 address.

In a possible implementation, the sending, by the terminal, a second connection request to the application server in response to receiving the second operation of the user, where the second connection request includes the IPv4 address corresponding to the first domain name further includes: The terminal sends a third domain name resolution request to the domain name system server in response to receiving the second operation of the user, to request the IPv6 address and the IPv4 address corresponding to the first domain name. The terminal receives the IPv6 address and the IPv4 address returned by the domain name system server, and sends the second connection request to the application server, where the second connection request includes the IPv4 address.

In a possible implementation, that the terminal determines that connection to the application server by using the IPv6 address fails includes: If the terminal determines that air-interface communication is normal and determines that a retransmission timer includes an IPv6-type socket, a status of the IPv6-type socket is a preset state, and a quantity of retransmission times of the first connection request is greater than a preset quantity of times, the terminal determines that the connection to the application server by using the IPv6 address fails.

In a possible implementation, when the processor reads the computer instructions from the memory, the terminal is further enabled to perform the following operation: after the terminal sets the first domain name corresponding to the IPv6 address to the restricted information, deleting the cached IPv6 address corresponding to the first domain name.

In a possible implementation, when the processor reads the computer instructions from the memory, the terminal is further enabled to perform the following operation: after a preset time period, setting the first domain name to non-restricted information.

In a possible implementation, when the processor reads the computer instructions from the memory, the terminal is enabled to perform the following operations: after the terminal sets the first domain name to the non-restricted information, receiving a third operation of the user, where the third operation indicates to access the first domain name; and sending a third connection request to the application server in response to receiving the third operation of the user, where the third connection request includes the IPv6 address corresponding to the first domain name.

According to a fourth aspect, an apparatus is provided. The apparatus is included in a terminal, and the apparatus has a function of implementing behavior of the terminal in any method according to the foregoing aspects and the possible implementations. The function may be implemented by hardware, or may be implemented by hardware executing corresponding software. The hardware or the software includes at least one module or unit corresponding to the foregoing function, for example, a receiving module or unit, a sending module or unit, and a processing module or unit.

According to a fifth aspect, a chip system is provided, including a processor. When the processor executes instructions, the processor performs the method according to any one of the foregoing aspects and the possible implementations of the foregoing aspects.

According to a sixth aspect, a computer-readable storage medium is provided, including computer instructions. When the computer instructions are run on a terminal, the terminal is enabled to perform the method according to any one of the foregoing aspects and the possible implementations of the foregoing aspects.

According to a seventh aspect, a computer program product is provided. When the computer program product runs on a computer, the computer is enabled to perform the method according to any one of the foregoing aspects and the possible implementations of the foregoing aspects.

DESCRIPTION OF EMBODIMENTS

In embodiments of this application, the word "example" or "for example" is used to represent giving an example, an illustration, or a description. Any embodiment or design scheme described as "example" or "for example" in embodiments of this application should not be explained as being more preferred or having more advantages than another embodiment or design scheme. Exactly, use of the word such as "example" or "for example" is intended to present a related concept in a specific manner.

The following terms "first" and "second" are merely intended for a purpose of description, and shall not be understood as an indication or implication of relative importance or implicit indication of a quantity of indicated technical features. Therefore, a feature limited by "first" or "second" may explicitly indicate or implicitly include one or more such features. In the descriptions of embodiments of this application, unless otherwise stated, "a plurality of" means two or more than two.

Figure 1:
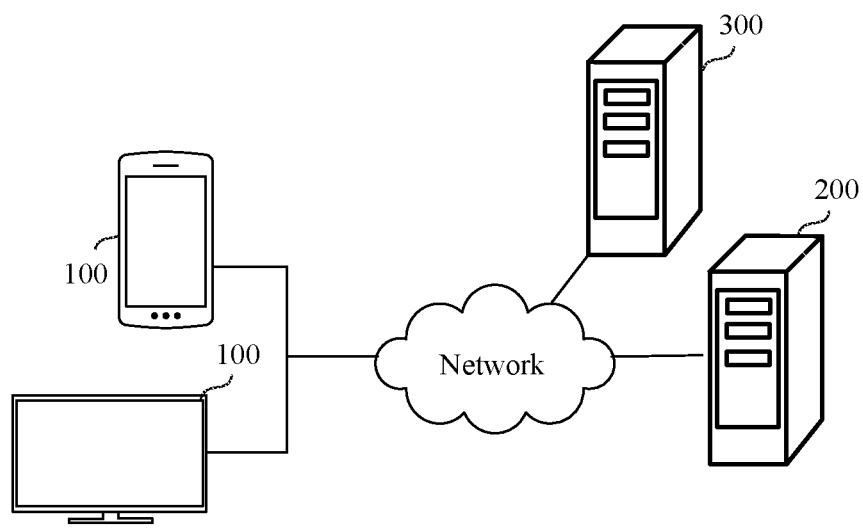
FIG. 1 is a schematic diagram of a structure of a communications system according to an embodiment of this application.

FIG. 1 shows a communications system according to an embodiment of this application. The communications system includes one or more terminals 100, one or more domain name system (Domain Name System, DNS) servers 200, and one or more application servers 300.

Generally, an application running on the terminal 100 accesses a corresponding application server 300 by using a domain name (domain name). First, the terminal 100 sends a domain name resolution request to the DNS server 200. The DNS server 200 resolves a domain name in the domain name resolution request to obtain an IP address (including an IPv4 address and an IPv6 address) corresponding to the domain name, and sends the IP address to the terminal 100. Then, the terminal 100 sends a connection request to the application server 300 by preferentially using the IPv6 address. If the application server 300 does not well support IPv6, the application server 300 cannot respond to the terminal 100. In this case, if the terminal 100 still does not receive a response after retrying a preset quantity of times, the terminal 100 sends a connection request to the application server 300 by using the IPv4 address, to establish a communication connection. It should be noted that an application server of IPv4 and an application server of IPv6 that are corresponding to a same domain name may be a same server (that is, the server is a dual-stack server), or may be different servers.

It can be learned that, if the application server 300 does not well support IPv6, each time the terminal 100 accesses the application server 300, the terminal 100 first sends a connection request by using the IPv6 address, but fails to receive a response from the application server 300 each time, and then sends a connection request by using the IPv4 address, to establish a communication connection to the application server 300. An entire process is time-consuming, and resources are wasted, thereby causing poor user experience. Therefore, embodiments of this application provide an application server access method. The terminal 100 can identify a scenario in which connection by using the IPv6 address fails, and record a domain name corresponding to IPv6 when the connection fails. When the terminal 100 re-accesses the domain name, the terminal 100 directly accesses the application server 300 by using the IPv4 address, to improve efficiency of connecting the terminal 100 to the application server 300, and improve user experience.

The terminal 100 may be, for example, a mobile phone, a tablet, a personal computer (personal computer, PC), a personal digital assistant (personal digital assistant, PDA), a smartwatch, a netbook, a wearable electronic device, or an augmented reality (augmented reality, AR) device, a virtual reality (virtual reality, VR) device, a vehicle-mounted device, an intelligent vehicle, a smart stereo, a robot. A specific form of the terminal is not specially limited in this application.

Figure 2:
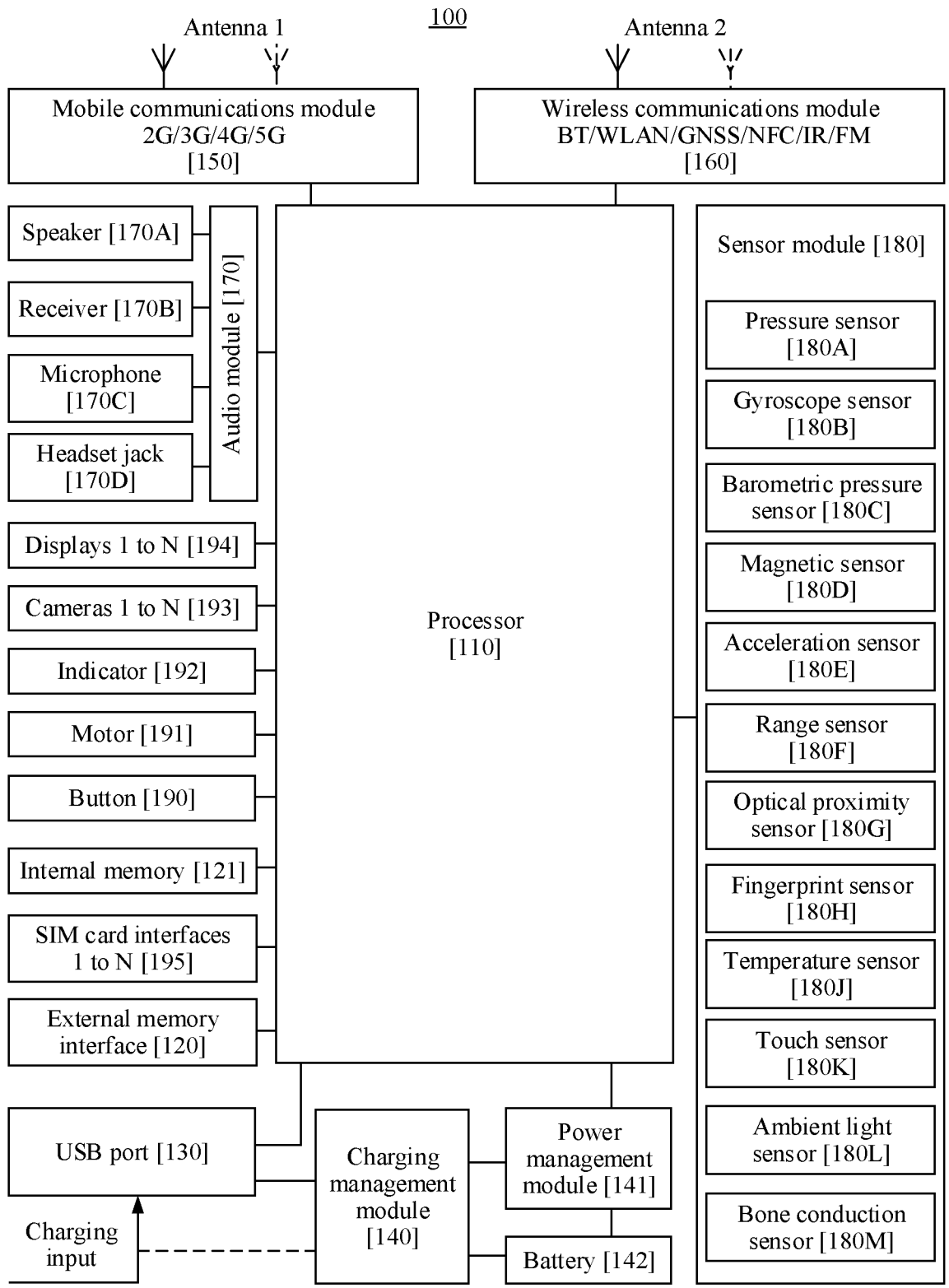
FIG. 2 is a schematic diagram of a structure of a terminal according to an embodiment of this application.

FIG. 2 is a schematic diagram of a structure of the terminal 100. The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural processing unit, NPU). Different processing units may be independent components, or may be integrated into one or more processors.

The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to USB standard specifications, and may specifically be a mini USB interface, a micro USB interface, a USB type-C interface, or the like. The USB interface 130 may be configured to connect to the charger to charge the terminal 100, or may be configured to perform data transmission between the terminal 100 and a peripheral device, or may be configured to connect to a headset to play audio by using the headset, or may be configured to connect to another terminal such as an AR device.

It may be understood that an interface connection relationship between the modules in this embodiment of the present invention is merely an example for description, and does not constitute a limitation on the structure of the terminal 100. In some other embodiments of this application, the terminal 100 may alternatively use an interface connection manner different from that in the foregoing embodiment, or may use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the terminal 100. The charging management module 140 may further supply power to the terminal by using the power management module 141 while charging the battery 142.

The power management module 141 is configured to connect to the battery 142 and the charging management module 140 to the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the terminal 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

In some embodiments of this application, the terminal 100 may establish a communication connection to a mobile communications network of an operator by using the mobile communications module 150, and access the internet through the mobile communications network. For example, the terminal communicates with the DNS server 200 and the application server 300 through the mobile communications network.

The wireless communications module 160 may provide a solution, applied to the terminal 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments of this application, the terminal 100 may establish a communication connection to the internet by using a Wi-Fi module in the wireless communications module 160, to access the internet. For example, the terminal communicates with the DNS server 200 and the application server 300.

In some embodiments, in the terminal 100, the antenna 1 is coupled to the mobile communications module 150, and the antenna 2 is coupled to the wireless communications module 160, so that the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal 100 may include one or N displays 194, where N is a positive integer greater than 1.

The terminal 100 may implement a photographing function by using the ISP, the camera 193, the video codec, the GPU, the display 194, the application processor, and the like.

The ISP may be configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 may play or record videos in a plurality of coding formats, for example, moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a mode of transmission between human brain neurons, and may further continuously perform self-learning. The NPU can implement applications such as intelligent cognition of the terminal 100, such as image recognition, facial recognition, speech recognition, and text understanding.

The external memory interface 120 may be configured to connect to an external memory card, for example, a micro SD card, to extend a storage capability of the terminal 100. The external memory card communicates with the processor 110 through the external memory interface 120, to implement a data storage function. For example, files such as music and a video are stored in the external memory card.

The internal memory 121 may be configured to store computer-executable program code, and the executable program code includes instructions. The internal memory 121 may include a program storage area and a data storage area. The program storage area may store an operating system, an application required by at least one function (for example, a sound playing function or an image playing function), and the like. The data storage area may store data (for example, audio data and a phone book) and the like created when the terminal 100 is used. In addition, the internal memory 121 may include a high-speed random access memory, or may include a nonvolatile memory such as at least one disk storage device, a flash memory, or a universal flash storage (universal flash storage, UFS). The processor 110 runs instructions stored in the internal memory 121 and/or instructions stored in the memory disposed in the processor, to perform various function applications of the terminal 100 and data processing.

The terminal 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The terminal 100 may listen to music or answer a call in a hands-free mode by using the speaker 170A.

The receiver 170B, also referred to as an "earpiece", is configured to convert an audio electrical signal into a sound signal. When a call is answered or audio information is listened to by using the terminal 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound near the microphone 170C through the mouth of the user, to enter a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The button 190 includes a power button, a volume button, and the like. The button 190 may be a mechanical button, or may be a touch button. The terminal 100 may receive a key input, and generate a key signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is compatible with different types of SIM cards. The SIM card interface 195 is also compatible with an external memory card. The terminal 100 interacts with a network through the SIM card, to implement functions such as calling and data communication. In some embodiments, the terminal 100 uses an eSIM, namely, an embedded SIM card. The eSIM card may be embedded in the terminal 100, and cannot be separated from the terminal 100.

A software system of the terminal 100 may use a layered architecture, an event-driven architecture, a microkernel architecture, a microservice architecture, or a cloud architecture. In this embodiment of the present invention, an Android system with the layered architecture is used as an example to illustrate a software structure of the terminal 100.

Figure 3:
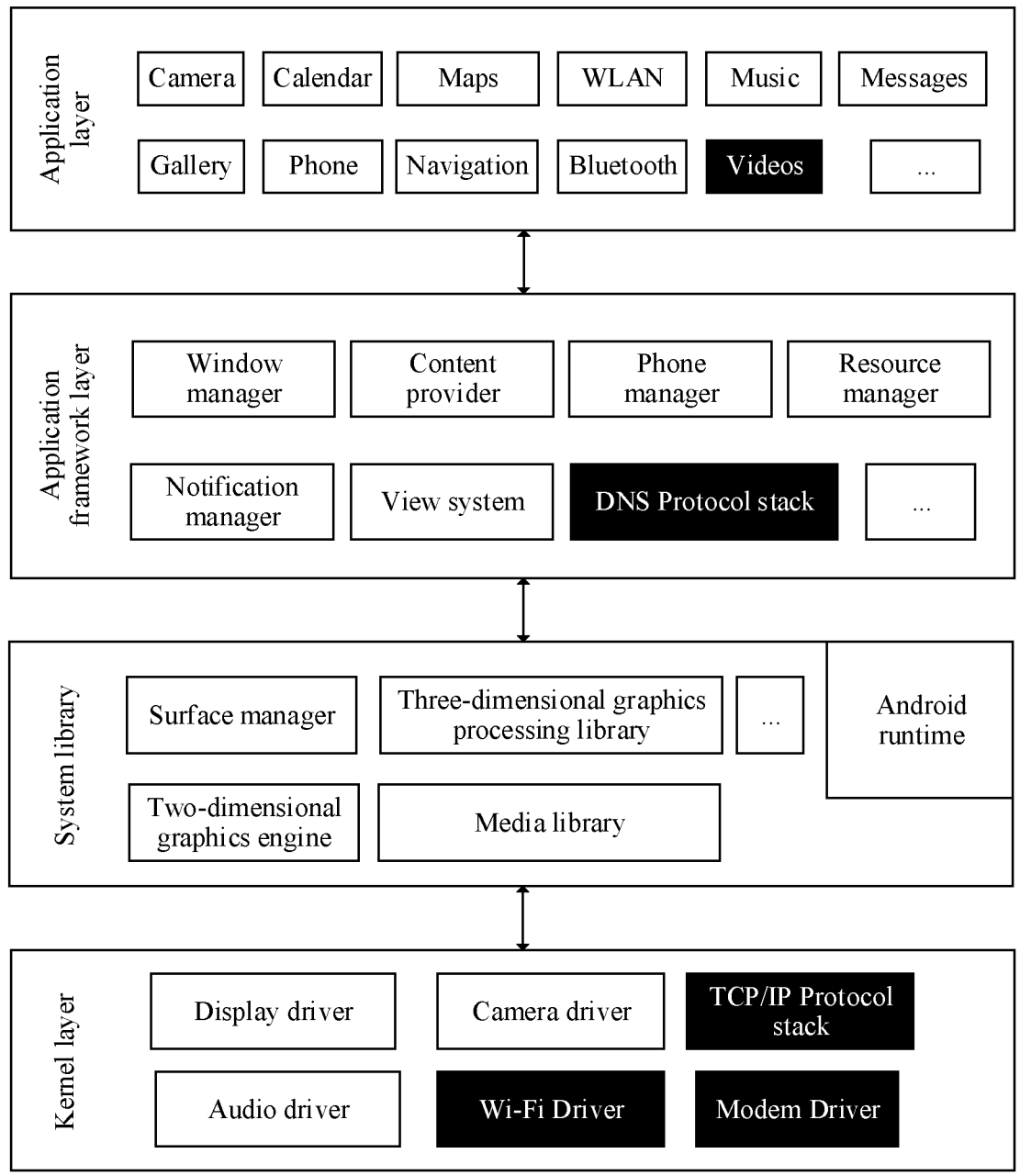
FIG. 3 is a schematic diagram of a structure of another terminal according to an embodiment of this application.

FIG. 3 is a block diagram of the software structure of the terminal 100 according to this embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

As shown in FIG. 3, the application layer may include a series of application packages, including an application preset before the terminal is delivered from a factory, or an application installed by a user in, for example, an application marketplace or another manner after the terminal is delivered from the factory. These applications include but are not limited to applications such as Camera, Gallery, Calendar, Phone, Maps, Navigation, WLAN, Bluetooth, Music, Videos, Messages, and Browser (only some are shown in the figure). Most of these application programs need to access the internet, for example, Navigation and Browser.

The application framework layer provides an application programming interface (application programming interface, API) and a programming framework for an application at the application layer. The application framework layer includes some predefined functions.

As shown in FIG. 3, the application framework layer includes a DNS protocol stack. An application at the application layer may send a domain name resolution request to the DNS server by using the DNS protocol stack. The DNS protocol stack may cache a domain name and a network address corresponding to the domain name, including the IPv6 address and the IPv4 address.

In some embodiments, the DNS protocol stack further maintains information about a restricted domain name and/or information about a restricted network address. In some examples, the DNS protocol stack may determine, based on the domain name resolution request sent by the application, whether a domain name requested to be resolved this time is a restricted domain name. If it is determined that the domain name requested to be resolved this time is the restricted domain name, when the domain name resolution request is sent to the DNS server, a protocol type in the domain name resolution request may be specified as a type A, that is, the IPv4 address corresponding to the domain name is requested. Subsequently, the application establishes a communication connection to the application server by using the returned IPv4 address for communication. In some other examples, after the DNS protocol stack receives the IPv4 address and the IPv6 address corresponding to the domain name and returned by the DNS server, if the DNS protocol stack determines that the domain name is the restricted domain name or determining that the returned IPv6 address is the restricted network address, the DNS protocol stack returns the IPv4 address corresponding to the domain name to the application. The application establishes a communication connection to the application server by using the returned IPv4 address for communication.

The application framework layer may further include a window manager, a content provider, a view system, a phone manager, a resource manager, a notification manager, and the like. The window manager is configured to manage a window program. The window manager may obtain a size of the display, determine whether there is a status bar, perform screen locking, take a screenshot, and the like. The content provider is configured to: store and obtain data, and enable the data to be accessed by an application. The data may include a video, an image, audio, calls that are made and received, a browsing history and a bookmark, a phone book, and the like. The view system includes visual controls such as a control for displaying a text and a control for displaying a photo. The view system may be configured to construct an application. A display interface may include one or more views. For example, a display interface including an SMS message notification icon may include a text display view and a photo display view. The phone manager is configured to provide a communication function for the terminal 100, for example, management of a call status (including answering, declining, or the like). The resource manager provides various resources such as a localized character string, an icon, a photo, a layout file, and a video file for an application. The notification manager enables an application to display notification information in a status bar, and may be configured to convey a notification type message. The displayed notification information may automatically disappear after a short pause and require no user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, an alert sound is played, the terminal vibrates, and the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, such as MPEG-4, H.264, MP3, AAC, AMR, JPG and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

In this embodiment of this application, the kernel layer includes a TCP/IP protocol stack, configured to encapsulate a message generated by an upper-layer application, to generate a message that conforms to a related inter-network communications protocol (for example, an IPv4 protocol or an IPv6 protocol), to transmit the message to a corresponding server through a network. Correspondingly, the TCP/IP protocol stack is also configured to parse a message that is received from the network and sent by the server, to generate a message that can be parsed by the upper-layer application, send the message to the upper-layer application for further processing, and the like.

The kernel layer further includes a Wi-Fi driver and a modem driver. The Wi-Fi driver may be configured to: establish and disconnect a Wi-Fi link between the terminal 100 and the DNS server 200 or the application server 300, and transmit a message by using the Wi-Fi link. The modem driver may be configured to: establish and disconnect a mobile communications link between the terminal 100 and a base station, and communicate with the DNS server 200 or the application server 300 through a mobile communications network by using the mobile communications link.

All technical solutions in the following embodiments may be implemented in the terminal 100 having the hardware architecture shown in FIG. 2 and the software architecture shown in FIG. 3. The following describes in detail the technical solutions provided in embodiments of this application with reference to the accompanying drawings.

Figure 4:
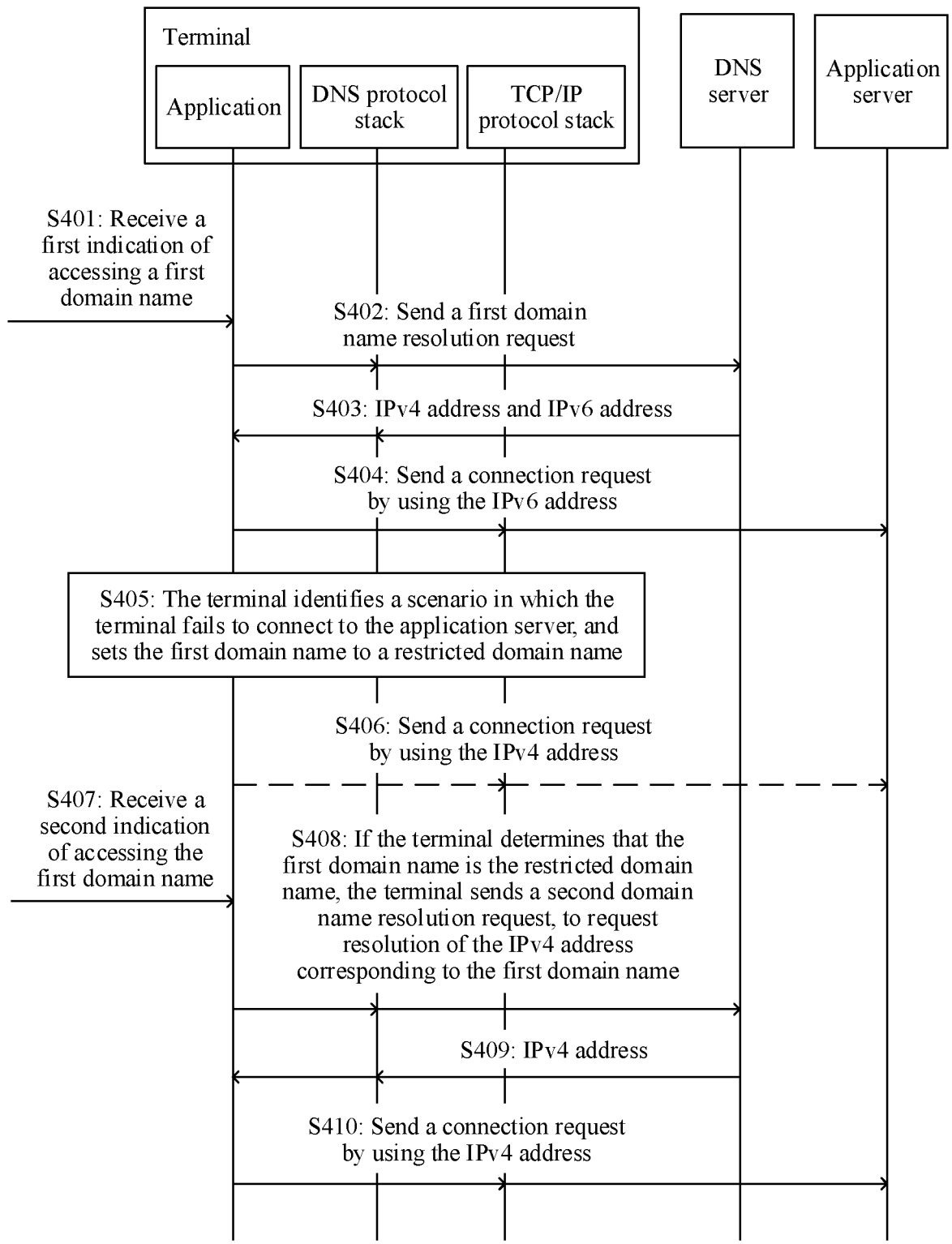
FIG. 4 is a schematic flowchart of an application server access method according to an embodiment of this application.

FIG. 4 is a schematic flowchart of a server access method according to an embodiment of this application. The procedure includes the following steps.

S401: A terminal receives a first indication of accessing a first domain name.

In some embodiments, the first indication of accessing the first domain name may be that an application installed on the terminal detects that a user performs an operation of accessing the first domain name. The operation may be one or more actions.

Figure 5A:
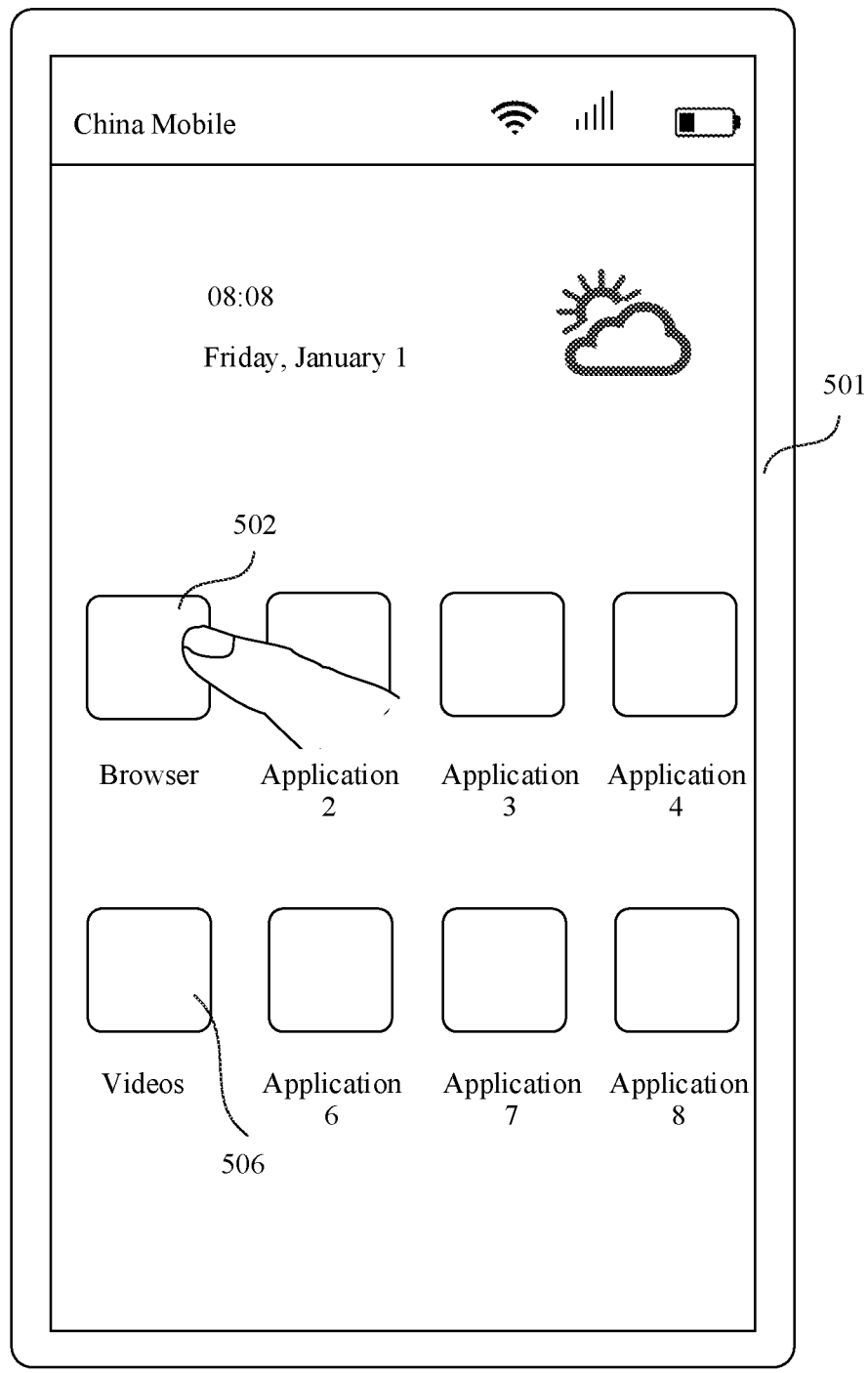
FIG. 5A to FIG. 5D are schematic diagrams of some user interfaces of a terminal according to an embodiment of this application.
Figure 5B:
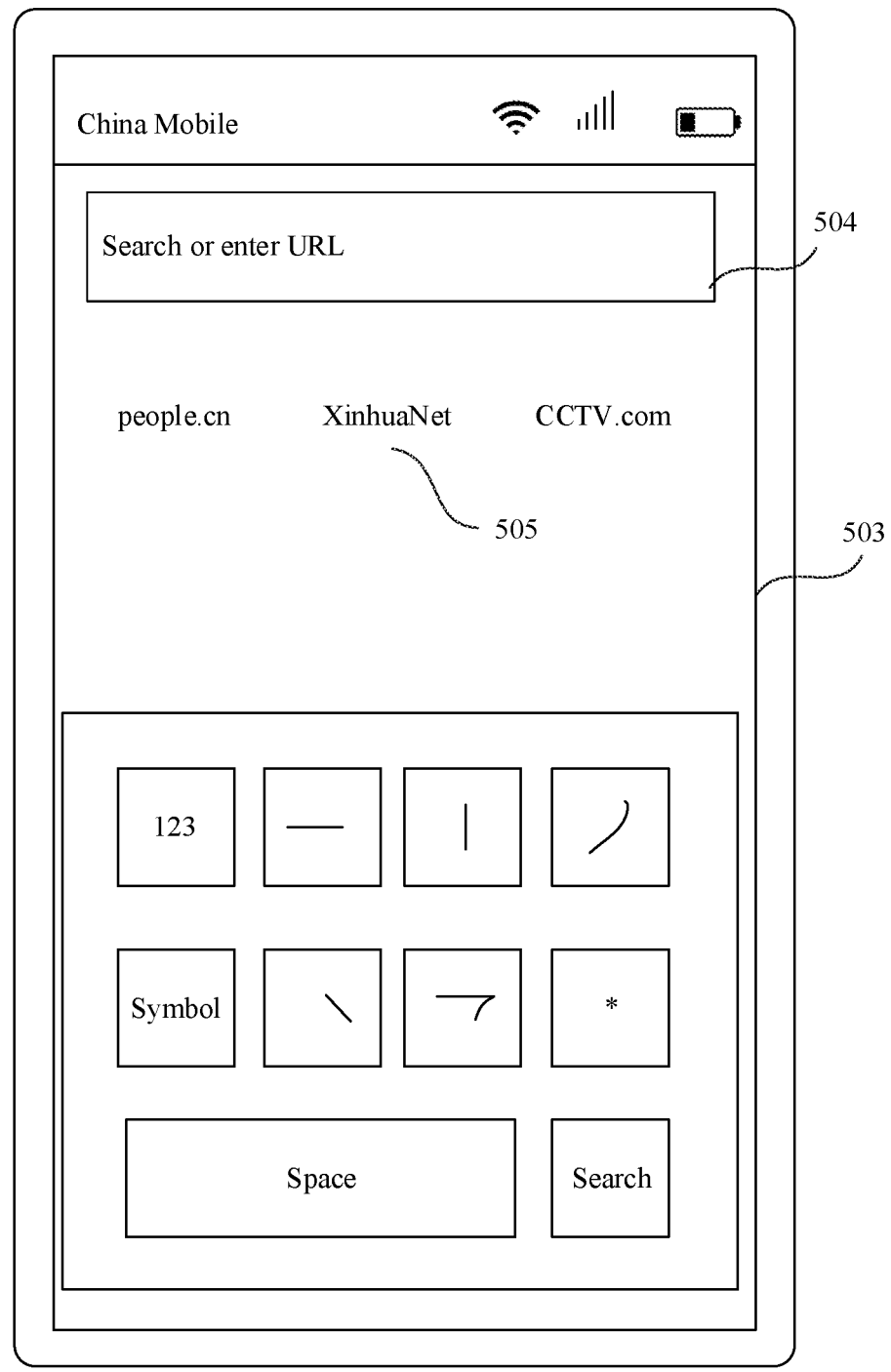

For example, as shown in FIG. 5A, when detecting an operation that the user taps an icon 502 of Browser on a home screen 501, the terminal displays a home screen 503 of Browser shown in FIG. 5B. Subsequently, the user may perform the operation of accessing the first domain name. For example, the operation may be an operation of entering a website or a keyword corresponding to the first domain name in an address bar 504 and tapping a "Search" control, or may be an operation of tapping, by the user, a link 505 corresponding to the first domain name on the home screen 503 of Browser, or the like. When detecting that the user performs the operation of accessing the first domain name, the terminal performs step S402 and subsequent steps to load a web page corresponding to the first domain name.

Figure 5C:
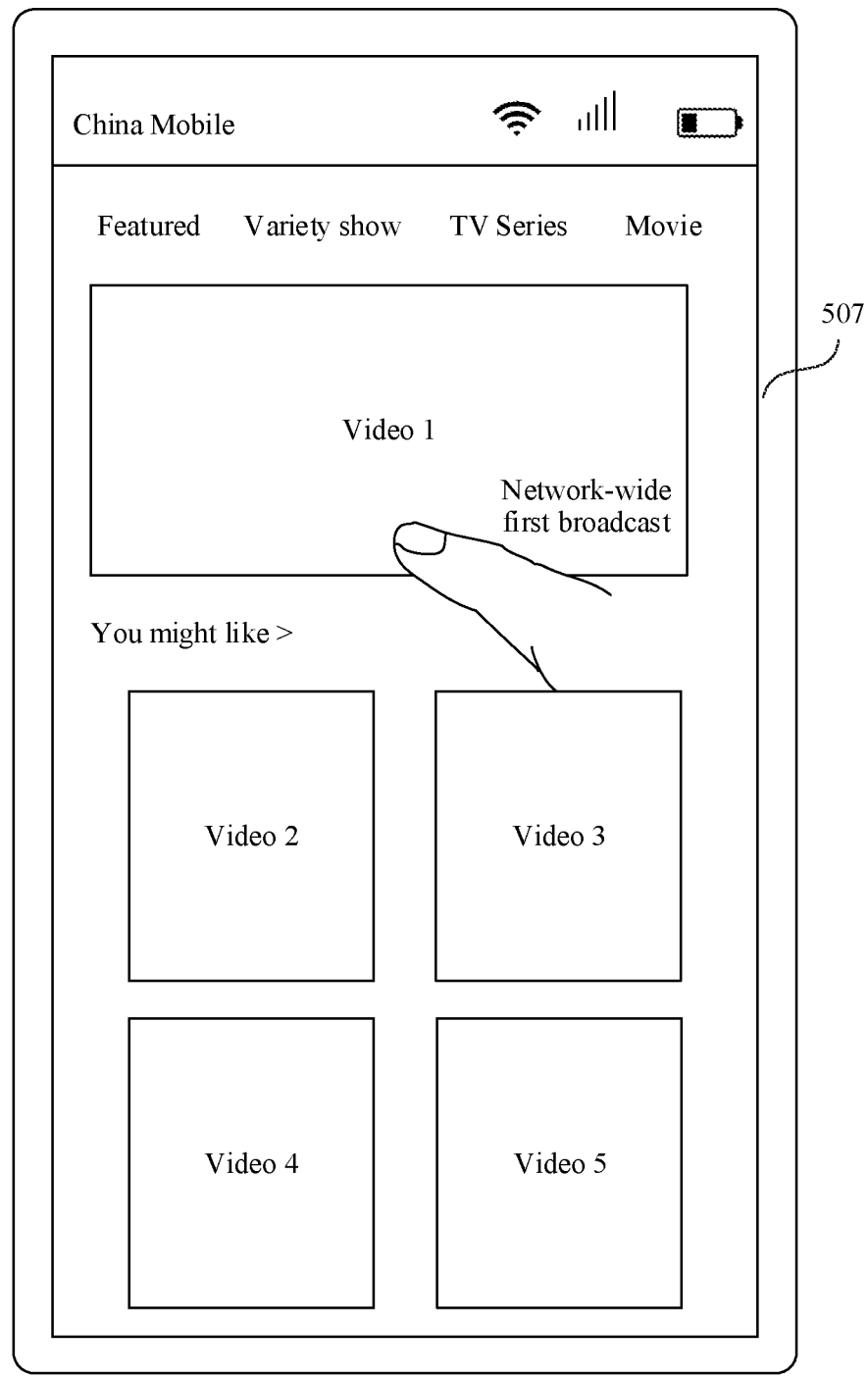
Figure 5D:
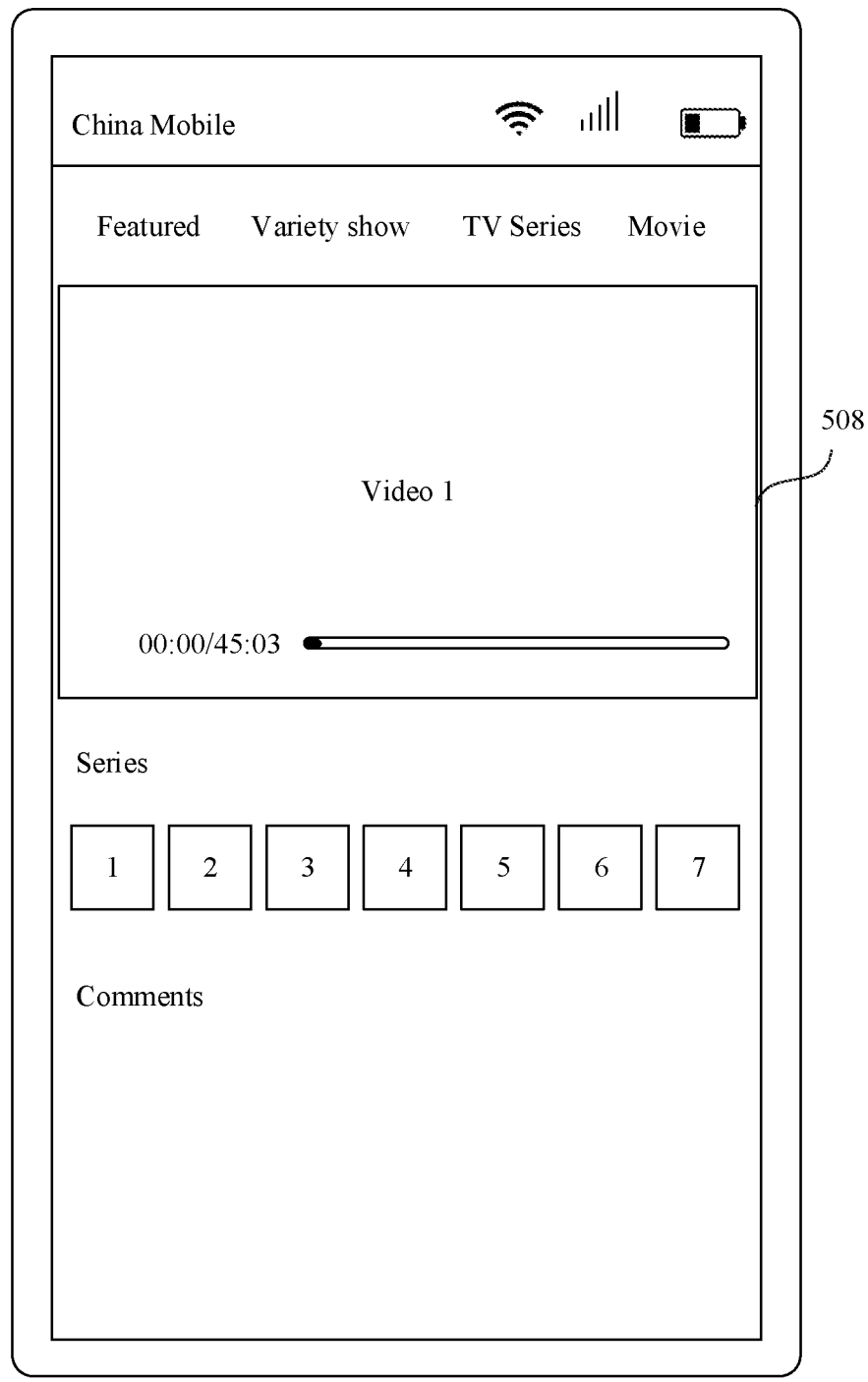

For another example, the operation of accessing the first domain name performed by the user may alternatively be an operation of tapping an icon 506 of Videos on the home screen 501 shown in FIG. 5A. In response to detecting, by the user, the operation of accessing the first domain name performed by the user, the terminal performs step S402 and the subsequent steps to load content of a home screen 507 of Videos. In some examples, Videos may preload the content of the home screen 507. In this case, the operation of accessing the first domain name performed by the user may alternatively be tapping a control 507 of a video (for example, a video 1) on the home screen 507 of Videos shown in FIG. 5C. In response to detecting, by the user, the operation of accessing the first domain name performed by the user, the terminal performs step S402 and the subsequent steps to load content of the video 1 in Videos, that is, load a play interface 508 of the video 1 in FIG. 5D.

S402: The terminal sends a first domain name resolution request to a DNS server, to request resolution of a network address corresponding to the first domain name.

In some embodiments, after the application detects the first indication of accessing the first domain name, the application searches, by using a DNS protocol stack at a framework layer, for the network address corresponding to the first domain name.

If the DNS protocol stack caches the network address corresponding to the first domain name, the network address may be directly used to request to connect to an application server.

If the DNS protocol stack does not cache the network address corresponding to the first domain name, the DNS protocol stack sends the first domain name resolution request to the DNS server, to request the DNS server to return the network address corresponding to the first domain name. The first domain name resolution request does not specify a protocol type, that is, ai_family is equal to AF_UNSPEC. Protocol types include an A type and an AAAA type. If the resolution request specifies that the protocol type is the A type, resolution of an IPv4 address corresponding to the first domain name is requested. If the resolution request specifies that the protocol type is the AAAA type, resolution of an IPv6 address corresponding to the first domain name is requested. If the resolution request does not specify a protocol type, resolution of the IPv4 address and the IPv6 address corresponding to the first domain name is requested. Therefore, network addresses corresponding to the first domain name that are returned by the DNS server herein include the IPv4 address and the IPv6 address.

The following steps are described by using an example in which the DNS protocol stack does not cache the network address corresponding to the first domain name.

S403: The DNS server returns the IPv4 address and the IPv6 address corresponding to the first domain name to the terminal.

S404: The terminal sends a connection request to the application server by using the IPv6 address.

The application preferentially establishes an IPv6 TCP socket (socket), and sends the connection request to the application server by using the IPv6 address. It can be learned from the TCP protocol that a three-way handshake process is required for establishing a TCP connection between the terminal and the application server. Specifically, the terminal (which may specifically be a TCP/IP protocol stack) invokes connect( ) sends SYN (that is, the first packet in a three-way handshake) to the application server, enters a SYN_SENT state, starts a retransmission timer, and waits for an acknowledgment (that is, the second packet in the three-way handshake) from the application server.

If the terminal receives, within preset duration of the retransmission timer, the acknowledgment sent by the server, the terminal switches from the SYN_SENT state to a SYN_REVD state. Then, the terminal sends an acknowledgment (that is, the third packet in the three-way handshake) to the application server. In this way, a communication connection is established between the terminal and the application server.

If the terminal still does not receive a response from the application server when the preset duration of the retransmission timer expires, the terminal retransmits the connection request. If the terminal receives the acknowledgment from the application server, the terminal switches from the SYN_SENT state to the SYN_REVD state, and sends the acknowledgment to the application server. If the terminal still does not receive a response from the application server after retrying a preset quantity of times (for example, five times), the terminal determines that connection to the application server fails, and enters a CLOSED state.

The following steps are described by using an example in which the terminal fails to establish a connection to the application server by using the IPv6 address.

S405: The terminal identifies a scenario in which the terminal fails to connect to the application server, and sets the first domain name to a restricted domain name.

In some embodiments, it can be learned from the descriptions of step S404 that the TCP/IP protocol stack records information such as a status of the TCP socket and a quantity of TCP timeout retransmission times. In this case, based on the information such as the status of the TCP socket and the quantity of TCP timeout retransmission times, the TCP/IP protocol stack may identify a scenario in which connection to the application server fails, that is, a problem scenario. Specifically, the TCP/IP protocol stack may identify the problem scenario based on the following conditions.

Condition 1: Air-interface communication of the terminal is normal.

In some embodiments, the TCP/IP protocol stack may count a quantity of uplink and downlink data packets of a network adapter. For example, when the terminal enables an internet access function, the TCP/IP protocol stack periodically counts the quantity of uplink and downlink data packets of the network adapter. Alternatively, when the terminal sends the connection request, the TCP/IP protocol stack starts to count the quantity of uplink and downlink data packets of the network adapter. This is not limited in this embodiment of this application.

In a specific implementation, the TCP/IP protocol stack may count a quantity of downlink data packets within a period 1 (for example, 10 seconds) in a netfilter hook manner. If the quantity of downlink data packets is greater than or equal to 1 within the period 1, it is considered that the air-interface communication of the terminal is normal.

Condition 2: A socket in the retransmission timer is determined as the IPv6 TCP socket.

For example, sk→sk-family—AF_INET6 indicates that the socket is the IPv6 TCP socket.

Condition 3: The status of the IPv6 TCP socket is TCPF_SYN_SENT, indicating that the terminal sends the first packet in the three-way handshake and does not receive an acknowledgment message from the application server, that is, does not receive the second packet in the three-way handshake.

Condition 4: The quantity of timeout retransmission times is greater than the preset quantity of times.

For example, the preset quantity of times is 5. If icsk→icsk_retransmits>=5, the quantity of timeout retransmission times is greater than the preset quantity of times.

If the conditions 1 to 4 are met, it is considered that the TCP/IP protocol stack identifies the problem scenario. Further, corresponding restricted information needs to be set based on the identified problem scenario, to improve a success rate of establishing a communication connection between the terminal and the application server, and improve efficiency of establishing the communication connection.

In some embodiments, a domain name corresponding to the IPv6 TCP socket in the problem scenario, that is, the first domain name, may be set to the restricted domain name. The restricted domain name indicates that the domain name is no longer accessed by preferentially using the IPv6 address but is directly accessed by using the IPv4 address.

Specifically, the TCP/IP protocol stack may send the identified IPv6 address in the IPv6 TCP socket to the DNS protocol stack by using a netlink socket. The DNS protocol stack finds the first domain name corresponding to the IPv6 address from a DNS cache, or the DNS protocol stack may invoke a getHostByAddr function to reversely find the first domain name corresponding to the IPv6 address from the DNS server on a network side. Then, the DNS protocol stack sets the first domain name to the restricted domain name. The DNS protocol stack may maintain a list of restricted domain names. In this case, the DNS protocol stack may add the first domain name to the list of restricted domain names.

In some other embodiments, the IPv6 address in the IPv6 TCP socket in the problem scenario may alternatively be set to a restricted network address. The restricted network address indicates that the network address is not used for access as much as possible. Specifically, the TCP/IP protocol stack may send the identified IPv6 address to the DNS protocol stack by using the netlink socket, and the DNS protocol stack sets the IPv6 address to the restricted network address. The DNS protocol stack may maintain a list of restricted network addresses. In this case, the DNS protocol stack may add the IPv6 address to the list of restricted domain names.

Certainly, the DNS protocol stack may alternatively set the first domain name corresponding to the identified IPv6 address to the restricted domain name and set the IPv6 address to the restricted network address. This is not limited in this embodiment of this application.

Optionally, after receiving the IPv6 address in the problem scenario returned by the TCP/IP protocol stack, the DNS protocol stack may clear the IPv6 address in the DNS cache. In this way, when subsequently re-accessing the first domain name, the application may directly use the cached IPv4 address corresponding to the first domain name to send a connection request. If the IPv4 address corresponding to the first domain name does not exist in the DNS cache, a domain name resolution request is re-sent to the DNS server to re-request a network address corresponding to the first domain name.

It should be noted that, when the terminal is powered on or connected to a network, the terminal may periodically identify a problem scenario, and periodically update a list of restricted domain names or restricted network addresses (referred to as a restricted list for short). Alternatively, after the terminal sends the connection request to the application server, the terminal may identify the problem scenario, and update the restricted list. An occasion in which the terminal identifies the problem scenario is not limited in this embodiment of this application.

In still some other embodiments, when maintaining the restricted list, the terminal may set a life cycle of the restricted list or a life cycle of each information item (that is, a restricted domain name or a restricted network address) in the restricted list. That is, within the life cycle, the restricted list or a corresponding information item in the restricted list is valid. After the life cycle expires, the restricted list or the corresponding information item in the restricted list is invalid.

For example, if the life cycle of the restricted list is set to seven days, the restricted list is valid within the life cycle (seven days). If all information items in the restricted list are valid, the terminal may also add a new information item to the restricted list. When the life cycle expires, the terminal deletes all existing content from the restricted list. The terminal re-adds a corresponding information item of a restricted domain name or a restricted network address to the restricted list based on identification of the problem scenario. This is equivalent to that the terminal periodically updates all the information items in the restricted list by using the life cycle as a cycle. Therefore, when the application server is updated, the application server may change from poor IPv6 support to good IPv6 support, and the terminal may restore to accessing the application server by preferentially using the IPv6 address.

For another example, the life cycle of each information item in the restricted list is set to seven days. For example, from a time point when the first domain name is added to the restricted list, the first domain name is a restricted domain name within the life cycle. When the life cycle expires, the first domain name is no longer a restricted domain name, and the first domain name may be deleted from the restricted list. Therefore, when the application server is updated, the terminal may restore to accessing the application server by preferentially using the IPv6 address.

S406: The terminal sends a connection request to the application server by using the IPv4 address.

In some embodiments, after the TCP/IP protocol stack fails to connect to the application server by using the IPv6 address, the application may automatically exit or prompt the user that connection to the application server fails. Alternatively, the TCP/IP protocol stack may continue to send the connection request to the application server by using the IPv4 address, to establish a communication connection. Specifically, after the connection to the application server by using the IPv6 address fails, the TCP/IP protocol stack may disable an abnormal IPv6 TCP socket, for example, invoke a tcp_abort interface to disable the abnormal IPv6 TCP socket. In this way, the application can sense the socket abnormality, then re-establish an IPv4 TCP socket, send the connection request to the application server by using the IPv4 address, and perform subsequent communication.

It should be noted that the application server accessed by the terminal by using the IPv6 address and the application server accessed by using the IPv4 address may be a same application server, or may be different application servers. Even if the application servers are different, both the application servers can provide a same service or similar services for the terminal.

S407: The terminal receives a second indication that indicates the terminal to access the application server corresponding to the first domain name.

The second indication indicates the terminal to access the application server corresponding to the first domain name. The second indication may be the same as or different from the first indication. However, both the second indication and the first indication indicate the terminal to access the first domain name. For other content of the second indication, refer to the related descriptions of the first indication in step S401. Details are not described herein again.

S408: If the terminal determines that the first domain name is the restricted domain name, the terminal sends a second domain name resolution request to the DNS server, to request resolution of the IPv4 address corresponding to the first domain name.

In some embodiments, after the application detects the second indication of accessing the first domain name, the application searches, by using the DNS protocol stack at the framework layer, for the network address corresponding to the first domain name. If the DNS protocol stack caches the network address corresponding to the first domain name, the network address may be directly used to request to connect to the application server. It should be noted that, as described in the foregoing step S405, when the first domain name is set to the restricted domain name, the DNS protocol stack clears the IPv6 address corresponding to the first domain name in the DNS cache. That is, in this case, the network address that is corresponding to the first domain name and that is found in the DNS cache is the IPv4 address. In this case, the application may avoid a connection failure caused by connecting to the application server by preferentially using the IPv6 address, and directly send the connection request to the application server by using the IPv4 address, thereby improving a success rate of connecting to the application server and efficiency of successful connection.

If the DNS protocol stack does not cache the network address corresponding to the first domain name, the DNS protocol stack compares the first domain name with the list of restricted domain names, determines that the first domain name is the restricted domain name, and sends the second domain name resolution request to the DNS server, to request the DNS to return the network address corresponding to the first domain name. A protocol type in the second domain name request is set to the A type, that is, ai_family is set to PF_INET. In this case, when receiving the second domain name resolution request, the DNS server resolves only an A-type network address corresponding to the first domain name, that is, the IPv4 address. In this way, a case that the application sends the connection request by using the IPv6 address can be avoided. It should be noted that, in the conventional technology, in this case, the terminal still requests the IPv4 address and the IPv6 address corresponding to the first domain name.

The following steps are described by using an example in which the DNS protocol stack does not cache the network address corresponding to the first domain name.

S409: The DNS server returns the IPv4 address corresponding to the first domain name to the terminal.

S410: The terminal sends a connection request to the application server by using the IPv4 address.

After receiving the returned IPv4 address corresponding to the first domain name, the application establishes the IPv4 TCP socket, sends a connection request to the application server by using the TCP/IP protocol stack, and establishes a communication connection to the application server for communication.

In conclusion, in the conventional technology, the terminal does not identify the problem scenario in which connection performed by the terminal by using the IPv6 address fails, and does not set a domain name in the problem scenario to a restricted domain name. In this case, when the domain name is re-accessed later, resolution of the IPv4 address and the IPv6 address of the first domain name is still requested. After the IPv4 address and the IPv6 address are received, a connection request is sent to the application server still by preferentially using the IPv6 address. Therefore, if the application server does not well support IPv6, the application server may repeatedly fail to be connected.

In some embodiments of this application, the terminal identifies the problem scenario in which connection performed by the terminal by using the IPv6 address fails, and sets an accessed domain name (that is, the first domain name) in the problem scenario to a restricted domain name. In this way, when the first domain name is re-accessed later, only the IPv4 address corresponding to the first domain name may be requested, and the IPv4 address is directly used to connect to the application server subsequently. Therefore, when the application server does not well support IPv6, a case in which the terminal repeatedly connects to the application server by preferentially using the IPv6 address and repeatedly fails may be avoided. This improves a success rate of connection between the terminal and the application server and efficiency of successful connection, and helps improve user's internet access experience.

Figure 6:
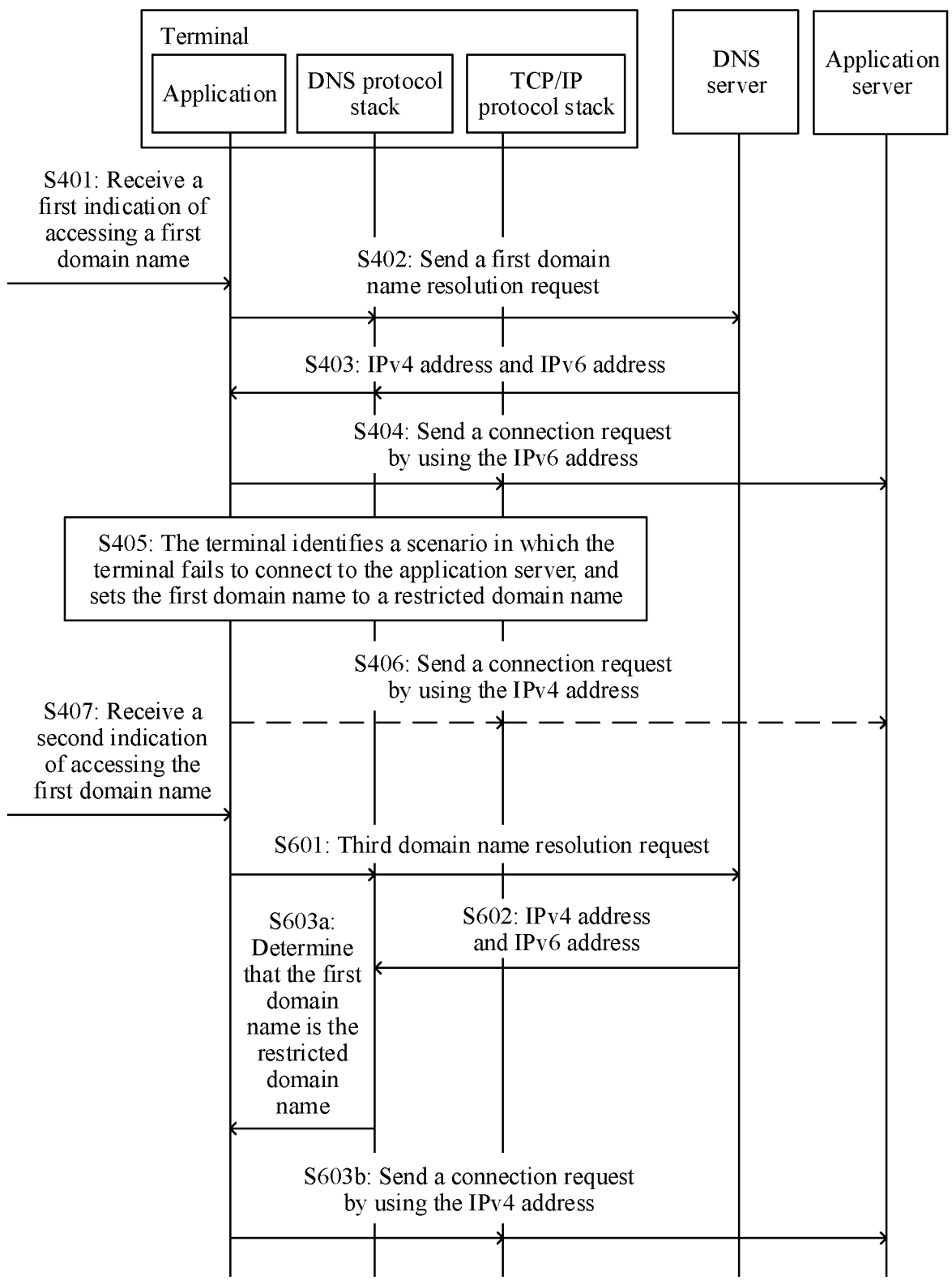
FIG. 6 is a schematic flowchart of another application server access method according to an embodiment of this application.

In the foregoing embodiment, when the terminal re-accesses the first domain name, the terminal first determines whether the first domain name is a restricted domain name, and requests only the IPv4 address corresponding to the first domain name from the DNS server if the first domain name is the restricted domain name. In some other embodiments, the terminal may still first request the DNS server to resolve the IPv4 address and the IPv6 address of the first domain name, and then determine whether the first domain name is a restricted domain name. If it is determined that the first domain name is the restricted domain name, a connection request is sent to the application server by using only the IPv4 address. In other words, the foregoing steps S408 to S410 may be replaced with step S501 to step S503. FIG. 6 is an example flowchart of another server access method according to an embodiment of this application. The method includes step S401 to step S407 and step S601 to step S603.

For step S401 to step S407 and step S410, refer to the foregoing descriptions. Details are not described herein again.

S601: The terminal sends a third domain name resolution request for the first domain name to the DNS server, to request resolution of a network address corresponding to the first domain name.

The third domain name resolution request does not specify a protocol type, that is, ai_family is equal to AF_UNSPEC. For this step, refer to the descriptions of related content in step S402.

S602: The DNS server returns the IPv4 address and the IPv6 address corresponding to the first domain name to the terminal.

S603: If the terminal determines that the first domain name is a restricted domain name, the terminal sends a connection request to the application server by using the IPv4 address.

In some embodiments, after receiving the IPv4 address and the IPv6 address corresponding to the first domain name that are returned by the DNS server, the DNS protocol stack may compare the first domain name with the list of restricted domain names. If it is determined, after the comparison, that the first domain name is the restricted domain name, the DNS protocol stack preferentially returns the received IPv4 address to the application, or returns only the IPv4 address to the application (as shown in step S603a in the figure), or directly deletes the IPv6 address. In this case, the application establishes an IPv4 TCP socket based on the received IPv4 address, sends the connection request to the application server by using the TCP/IP protocol stack (as shown in step S603b in the figure), and establishes a communication connection to the application server for communication.

In some other embodiments, after receiving the IPv4 address and the IPv6 address corresponding to the first domain name that are returned by the DNS server, the DNS protocol stack may alternatively compare the IPv6 address corresponding to the first domain name with a list of restricted network addresses. If it is determined, after the comparison, that the IPv6 address corresponding to the first domain name is a restricted network address, the DNS protocol stack preferentially returns the received IPv4 address to the application, or returns only the IPv4 address to the application. In this case, the application establishes a communication connection to the application server based on the received IPv4 address for communication.

In still some other embodiments, if the DNS server returns only the IPv6 address corresponding to the first domain name, the DNS protocol stack may alternatively not determine whether the first domain name is a restricted domain name, not determine whether the IPv6 address corresponding to the first domain name is a restricted network address, but directly return the IPv6 address corresponding to the first domain name to the application.

In still some other embodiments, when the application fails to connect to the application server by using the IPv4 address, the DNS protocol stack may return the IPv6 address corresponding to the first domain name to the application, so that the application attempts to connect to the application server again by using the IPv6 address. Alternatively, the DNS protocol stack may preferentially send the IPv4 address corresponding to the first domain name, and then send the IPv6 address corresponding to the first domain name. In this way, the application connects to the application server by preferentially using the IPv4 address. If the connection fails, the application attempts to connect to the application server again by using the IPv6 address.

It can be learned that, in this embodiment of this application, a problem scenario in which connection performed by the terminal by using the IPv6 address fails is identified, and an accessed domain name in the problem scenario is set to a restricted domain name, or the IPv6 address in the problem scenario is set to a restricted domain name. In this way, when the domain name is re-accessed later, the IPv4 address may be directly used to connect to the application server. Therefore, when the application server does not well support IPv6, a case in which the terminal repeatedly connects to the application server by preferentially using the IPv6 address and repeatedly fails may be avoided. This improves a success rate of connection between the terminal and the application server and efficiency of successful connection, and helps improve user's internet access experience.

The following describes the method provided in this embodiment of this application with reference to a specific scenario by using an example in which a user operates Browser on a terminal.

As shown in FIG. 5B, when the terminal detects that the user enters a website address or a keyword in the address bar 504, the terminal determines, based on the entered website address or keyword, a domain name A corresponding to the website address or the keyword. Then, the terminal requests the DNS server to resolve a network address corresponding to the domain name A. In this case, a domain name resolution request does not specify a protocol type. In this case, the terminal receives the IPv4 address and the IPv6 address corresponding to the domain name A and returned by the DNS server. The terminal sends a connection request to an application server A by preferentially using the IPv6 address. If the application server A does not well support IPv6, the terminal cannot receive a response from application server A. In some examples, the terminal automatically exits Browser, or prompts the user that "Failed to connect to the server". In another example, the terminal sends a connection request to the application server A by using the IPv4 address again, and the terminal establishes a communication connection to the application server A. The user may properly use Browser.

The terminal may identify, through determining in the foregoing condition 1 to condition 4, a problem scenario in which the terminal fails to connect to the application server A by using the IPv6 address corresponding to the domain name A. The terminal adds the domain name A and/or the IPv6 address corresponding to the domain name A to a restricted list.

If the terminal receives an indication of accessing the domain name A again, the terminal first determines whether the domain name A is a restricted domain name, that is, whether the domain name A is in the restricted list. If determining that the domain name A is in the restricted list, the terminal requests the DNS server to resolve only the IPv4 address corresponding to the domain name A. In this case, the domain name resolution request specifies that the protocol type is the A type. In this case, the terminal can receive only the IPv4 address corresponding to the domain name A. The terminal sends the connection request to the application server A by using the IPv4 address, and establishes the communication connection for communication.

Alternatively, when the terminal receives an indication of accessing the domain name A again, the terminal requests the DNS server to resolve the network address corresponding to the domain name A. In this case, the domain name resolution request does not specify a protocol type. In this case, the terminal receives the IPv4 address and the IPv6 address corresponding to the domain name A and returned by the DNS server. Before the terminal sends the connection request to the application server A, the terminal determines whether the domain name A is a restricted domain name. When the terminal determines that the domain name A is the restricted domain name, the terminal may send the connection request to the application server A by directly using the IPv4 address, and establish the communication connection for communication. Optionally, when the terminal determines that the domain name A is the restricted domain name, the terminal may delete the IPv6 address corresponding to the domain name A.

It can be learned that, when the application server does not well support IPv6, the foregoing methods may avoid a case in which the terminal sends a connection request to the application server A by repeatedly using the IPv6 address and causes repeated connection failures.

If the terminal receives an indication of accessing a domain name B, the terminal first determines whether the domain name B is a restricted domain name, that is, whether the domain name B is in the restricted list. If the terminal determines that the domain name B is not the restricted domain name, that is, is not in the restricted list, the terminal requests the DNS server to resolve a network address of the domain name B. In this case, the domain name resolution request does not specify a protocol type. In this case, the terminal receives the IPv4 address and the IPv6 address corresponding to the domain name B and returned by the DNS server. The terminal sends a connection request to an application server B by preferentially using the IPv6 address. If a response from the application server B is received, the terminal establishes a communication connection to the application server B for communication.

Alternatively, when the terminal receives the indication of accessing the domain name B, the terminal requests the DNS server to resolve the network address corresponding to the domain name B. In this case, the domain name resolution request does not specify a protocol type. In this case, the terminal receives the IPv4 address and the IPv6 address corresponding to the domain name A and returned by the DNS server. Before the terminal sends the connection request to the application server B, the terminal determines whether the domain name B is a restricted domain name. When the terminal determines that the domain name B is not the restricted domain name, the terminal sends the connection request to the application server B by preferentially using the IPv6 address. If a response from the application server B is received, the terminal establishes a communication connection to the application server B for communication.

In some examples, when maintaining the restricted list, the terminal may alternatively set a life cycle for the restricted list or each information item in the restricted list. For example, the life cycle of the restricted list is set as 7 days. In this case, when the restricted list is within the life cycle and the terminal re-accesses the domain name A, the terminal no longer sends the connection request to the application server A by using the IPv6 address corresponding to the domain name A, but sends the connection request to the application server A by directly using the IPv4 address corresponding to the domain name A.

After the restricted list is beyond the life cycle, the terminal deletes all information items in the restricted list, including the domain name A. In this case, if the terminal re-accesses the domain name A, the terminal still requests the IPv4 address and IPv6 address corresponding to the domain name A from the DNS server, and requests a connection to the application server A by preferentially using the IPv6 address. In this case, if the application server A better supports the IPv6, the application server A responds to the terminal. In this case, the terminal establishes a communication connection to the application server by using the IPv6 address for communication. In this case, if the application server A still does not well support IPv6, the application server A does not respond to the terminal. In this case, the terminal identifies a connection failure scenario, and re-adds the domain name A to the restricted list. Then, within a new life cycle of the restricted list, when the terminal re-accesses the domain name A, the terminal communicates with the application server A by directly using the IPv4 address.

Figure 7:
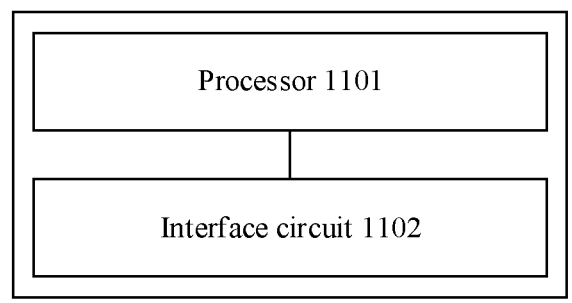
FIG. 7 is a schematic diagram of a structure of a chip system according to an embodiment of this application.

An embodiment of this application further provides a chip system. As shown in FIG. 7, the chip system includes at least one processor 1101 and at least one interface circuit 1102. The processor 1101 and the interface circuit 1102 may be interconnected through a line. For example, the interface circuit 1102 may be configured to receive a signal from another apparatus (for example, a memory in the terminal 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, a terminal may be enabled to perform steps performed by the terminal 100 (for example, a mobile phone) in the foregoing embodiments. Certainly, the chip system may further include another discrete component. This is not specifically limited in this embodiment of this application.

An embodiment of this application further provides an apparatus. The apparatus is included in a terminal, and the apparatus has a function of implementing behavior of the terminal in any method in the foregoing embodiments. The function may be implemented by hardware, or may be implemented by hardware executing corresponding software. The hardware or the software includes at least one module or unit corresponding to the foregoing function, for example, a receiving module or unit, a sending module or unit, and a determining module or unit.

An embodiment of this application further provides a computer-readable storage medium, including computer instructions. When the computer instructions are run on a terminal, the terminal is enabled to perform any method in the foregoing embodiments.

An embodiment of this application further provides a computer program product. When the computer program product runs on a computer, the computer is enabled to perform any method in the foregoing embodiments.

It may be understood that, to implement the foregoing functions, the terminal includes a corresponding hardware structure and/or software module for executing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of the present invention.

In embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of the present invention, module division is an example, and is merely a logical function division. During actual implementation, another division manner may be used.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and units, refer to a corresponding process in the foregoing method embodiments. Details are not described herein again.

Function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of this application. The foregoing storage medium includes any medium that can store program code, such as a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communications system, comprising a terminal, a domain name system server, and an application server, wherein:
the terminal is configured to:
receive a first operation of a user, wherein the first operation indicates to access a first domain name; and
send a first domain name resolution request to the domain name system server, wherein the first domain name resolution request is used to request an IPv4 address and an IPv6 address corresponding to the first domain name;
the domain name system server is configured to return, according to the first domain name resolution request, the IPv4 address and the IPv6 address corresponding to the first domain name to the terminal; and the terminal is further configured to:
send a first connection request to the application server, wherein the first connection request comprises the IPv6 address corresponding to the first domain name;
in response to determining that connection to the application server by using the IPv6 address fails, set the first domain name corresponding to the IPv6 address to restricted information;
receive a second operation of the user, wherein the second operation indicates to re-access the first domain name;
send a second connection request to the application server, wherein the second connection request comprises the IPv4 address corresponding to the first domain name; and
in response to determining that air-interface communication of the terminal is normal and determining that a retransmission timer comprises an IPv6-type socket, a status of the IPv6-type socket is a preset state, and a quantity of retransmission times of the first connection request is greater than a preset quantity of times, determine that the connection to the application server by using the IPv6 address fails.

2. The communications system according to claim 1, wherein the terminal is further configured to:
before sending the second connection request to the application server, send a second domain name resolution request to the domain name system server to request the IPv4 address corresponding to the first domain name.

3. The communications system according to claim 1, wherein the terminal is further configured to:
before sending the second connection request to the application server, send a third domain name resolution request to the domain name system server to request the IPv4 address and the IPv6 address corresponding to the first domain name.

4. The communications system according to claim 1, wherein the terminal is further configured to:
after a preset time period, set the first domain name to non-restricted information.

5. The communications system according to claim 4, wherein the terminal is further configured to:
receive a third operation of the user, wherein the third operation indicates to access the first domain name; and
send a third connection request to the application server, wherein the third connection request comprises the IPv6 address corresponding to the first domain name.

6. An application server access method, wherein the method comprises:
receiving, by a terminal, a first operation of a user, wherein the first operation indicates to access a first domain name;
sending, by the terminal, a first domain name resolution request to a domain name system server in response to receiving the first operation of the user, wherein the first domain name resolution request is used to request an IPv4 address and an IPv6 address corresponding to the first domain name;
sending, by the terminal, a first connection request to an application server, wherein the first connection request comprises the IPv6 address corresponding to the first domain name;
in response to determining that connection to the application server by using the IPv6 address fails, setting, by the terminal, the first domain name corresponding to the IPv6 address to restricted information;
receiving, by the terminal, a second operation of the user, wherein the second operation indicates to re-access the first domain name;
sending, by the terminal, a second connection request to the application server in response to receiving the second operation of the user, wherein the second connection request comprises the IPv4 address corresponding to the first domain name; and
in response to determining that air-interface communication of the terminal is normal and determining that a retransmission timer comprises an IPv6-type socket, a status of the IPv6-type socket is a preset state, and a quantity of retransmission times of the first connection request is greater than a preset quantity of times, determining, by the terminal, that the connection to the application server by using the IPv6 address fails.

7. The method according to claim 6, wherein the sending, by the terminal, a second connection request to the application server in response to receiving the second operation of the user comprises:
sending, by the terminal, a second domain name resolution request to the domain name system server to request the IPv4 address corresponding to the first domain name; and
receiving, by the terminal, the IPv4 address returned by the domain name system server, and sending the second connection request to the application server, wherein the second connection request comprises the IPv4 address.

8. The method according to claim 6, wherein the sending, by the terminal, a second connection request to the application server in response to receiving the second operation of the user comprises:
sending, by the terminal, a third domain name resolution request to the domain name system server to request the IPv6 address and the IPv4 address corresponding to the first domain name; and
receiving, by the terminal, the IPv6 address and the IPv4 address returned by the domain name system server, and sending the second connection request to the application server, wherein the second connection request comprises the IPv4 address.

9. The method according to claim 6, wherein after the setting, by the terminal, the first domain name corresponding to the IPv6 address to restricted information, the method further comprises:
deleting, by the terminal, a cached IPv6 address corresponding to the first domain name.

10. The method according to claim 6, wherein the method further comprises:
after a preset time period, setting, by the terminal, the first domain name to non-restricted information.

11. The method according to claim 10, wherein after the setting, by the terminal, the first domain name to non-restricted information, the method further comprises:
receiving a third operation of the user, wherein the third operation indicates to access the first domain name; and
sending, by the terminal, a third connection request to the application server in response to receiving the third operation of the user, wherein the third connection request comprises the IPv6 address corresponding to the first domain name.

12. A terminal, comprising:
at least one processor;
a memory; and a touchscreen, wherein the memory and the touchscreen are coupled to the at least one processor, and the memory stores programming instructions for execution by the at least one processor to cause the terminal to perform operations comprising:

receiving a first operation of a user, wherein the first operation indicates to access a first domain name;

sending a first domain name resolution request to a domain name system server in response to receiving the first operation of the user, wherein the first domain name resolution request is used to request an IPv4 address and an IPv6 address corresponding to the first domain name;

sending a first connection request to an application server, wherein the first connection request comprises the IPv6 address corresponding to the first domain name;

in response to determining that connection to the application server by using the IPv6 address fails, setting the first domain name corresponding to the IPv6 address to restricted information;

receiving a second operation of the user, wherein the second operation indicates to re-access the first domain name;

sending, by the terminal, a second connection request to the application server in response to receiving the second operation of the user, wherein the second connection request comprises the IPv4 address corresponding to the first domain name; and in response to determining that air-interface communication of the terminal is normal and determining that a retransmission timer comprises an IPv6-type socket, a status of the IPv6-type socket is a preset state, and a quantity of retransmission times of the first connection request is greater than a preset quantity of times, determine that the connection to the application server by using the IPv6 address fails.

13. The terminal according to claim 12, wherein the sending, by the terminal, a second connection request to the application server in response to receiving the second operation of the user comprises:

sending, by the terminal, a second domain name resolution request to the domain name system server to request the IPv4 address corresponding to the first domain name; and receiving, by the terminal, the IPv4 address returned by the domain name system server, and sending the second connection request to the application server, wherein the second connection request comprises the IPv4 address.

14. The terminal according to claim 12, wherein the sending, by the terminal, a second connection request to the application server in response to receiving the second operation of the user comprises:

sending, by the terminal, a third domain name resolution request to the domain name system server to request the IPv6 address and the IPv4 address corresponding to the first domain name; and receiving, by the terminal, the IPv6 address and the IPv4 address returned by the domain name system server, and sending the second connection request to the application server, wherein the second connection request comprises the IPv4 address.

15. The terminal according to claim 12, wherein the operations further comprise:

after the terminal sets the first domain name corresponding to the IPv6 address to the restricted information, deleting a cached IPv6 address corresponding to the first domain name.

16. The terminal according to claim 12, wherein the operations further comprise:

after a preset time period, setting the first domain name to non-restricted information.

17. The terminal according to claim 16, wherein the operations further comprise:

after the terminal sets the first domain name to the non-restricted information, receiving a third operation of the user, wherein the third operation indicates to access the first domain name; and sending a third connection request to the application server in response to receiving the third operation of the user, wherein the third connection request comprises the IPv6 address corresponding to the first domain name.

* * * * *